United States Patent [19]

Fichtner

[11] Patent Number: 5,001,490
[45] Date of Patent: Mar. 19, 1991

[54] MULTIFUNCTION RADAR TECHNIQUES

[75] Inventor: Johann Fichtner, Ebersberg, Fed. Rep. of Germany

[73] Assignee: Siemens Aktiengesellschaft, Berlin and Munich, Fed. Rep. of Germany

[21] Appl. No.: 562,683

[22] Filed: Aug. 3, 1990

[30] Foreign Application Priority Data

Aug. 8, 1989 [DE] Fed. Rep. of Germany ....... 3926216
Aug. 8, 1989 [DE] Fed. Rep. of Germany ....... 3926215
Aug. 8, 1989 [DE] Fed. Rep. of Germany ....... 3926197
Aug. 8, 1989 [DE] Fed. Rep. of Germany ....... 3926198

[51] Int. Cl.$^5$ .................. G01S 13/66; G01S 7/28
[52] U.S. Cl. ............................. 342/195; 342/81; 342/82
[58] Field of Search ................. 342/195, 81, 82

[56] References Cited

U.S. PATENT DOCUMENTS 4,724,438 2/1988 Arnold et al. .................. 342/195 X Primary Examiner—Gilberto Barrón, Jr.
Attorney, Agent, or Firm—Hill, Van Santen, Steadman & Simpson

[57] ABSTRACT

An optimization of the monitoring range is achieved for an antenna lobe position for the search function in a multi-function radar given a prescribed power part, as a result whereof the most beneficial signal shape, the most beneficial form of signal processing and the most beneficial sampling period are also supplied. In that case in which no clutter and no shadowings are present in the monitoring area to be covered by the multi-function radar, an instruction for optimum distribution of the radar power available for the search onto a plurality of antenna lobes is established. For general cases, an instruction for optimum distribution of the power available for the search onto a plurality of antenna lobes is established, namely by optimization of the prescribed cost-benefit function with the assistance of an iteration method sequencing in the clock of the generation of elementary radar requests. For general cases, a possiblity for generating a radar search request and for parallel up-dating of the planning for following search requests is also set forth.

9 Claims, 3 Drawing Sheets

MULTIFUNCTION RADAR TECHNIQUES

BACKGROUND OF THE INVENTION

1. Field of the Invention

The present invention relates to radar systems, and is particularly concerned with multifunction radar techniques for radars of the type having an electronically phase-controlled antenna, a signal generator, a transmitter, a receiver having a received signal processing device and a radar measuring equipment that comprises a radar control device, a target tracking device and a radar management assembly that, among other things, continues to define the antenna lobe position, the sampling period, the signal shape and the form of the signal processing and supplies instructions with respect thereto to the radar measuring equipment as elementary radar requests, as result thereof the radar power available in the radar measuring equipment is optimally utilized in the search at all times.

2. Description of the Prior Art

A multi-function radar having an electronically phasecontrolled antenna must satisfy a number of requirements. What can be particularly important are: a search in various regions, locating of objects for which a pre-indication is present, clarification of possible false alarms and, as warranted, the rapid initiation of target tracking, the tracking of targets of different categories, passive locating (for example triangulation and trilateration) and the recognition of clutter and shadowings.

The multi-function radar achieved these objects by suitable interaction of its assemblies shown on the drawing. First of all, there are thereby assemblies that manage the physical generation of the transmission signals as well as the reception and the signal processing up to the plot formation. In detail, these are a signal generator 1, a transmitter 2, and electronically phase-controlled antenna 3, a receiver 4 and a receiver processing device 5. Added thereto is the elementary coordination of these assemblies that, for example, assures that the phase shifters of the antenna 3 are correctly set, that the transmission and receiving frequencies match and the signal processing occurs such that it is suitable for the signal just emitted.

The assembly that executes this coordination is referred to as the radar control device 6. All of the assemblies mentioned up to this point should be identified under the collective term radar measuring instrument 7.

The radar measuring instrument defined in such a fashion is in the position to execute instructions in which it is defined where (lobe position), how long (illumination duration) and how (signal shape and signal processing form) the multi-function radar should "look". The illumination duration is thereby defined by the signal shape. Such an instruction that is composed of lobe position, signal shape and form of signal processing should be referred to as an elementary radar requests instruction. The radar measuring instrument must therefore receive elementary radar instructions. Dependent on the condition of the outside world, i.e. the scenario 8, it then generates plots or, respectively, strobes and supplies these to a multi-function radar target tracking device (tracker) 9 that processes these information. The processed information are supplied to a firing guidance stand 10.

The expense and the design of the radar measuring instrument is reflected in the quality of elementary radar information (or requests) that can be executed. In a phasedarray radar having a narrow radar beam ("pencil lobe"), a lobe position can be freely selected within a solid angular range. The dwell duration in this lobe position, the signal shape and the form of signal processing can likewise be selected from a great multitude of possibilities. When, in addition, it is considered that several hundred of such elementary radar requests are generally to be generated per second, then one has an idea of the multitude of technically-applied possibilities that the radar measuring instrument makes available.

What is to be understood by radar management assemblies 11 is than that assembly of a multi-function radar that, on the basis of a skillful utilization of the radar measuring instrument 7, sees to it that the multi-function radar optimally meets all of its above-mentioned duties and that target conflicts that thereby potentially arise are properly resolved.

As seen from the radar measuring instrument 7, the task of the radar management assembly 11 is comprised in granting the most beneficial elementary radar request at ever instant of time. The complexity of the radar management thereby results from unsurveyably-great plurality of possible combinations of elementary radar requests.

Selecting the best combination for each time interval dependent on the constantly-changing environmental influences and the likewise dynamic tactical situation is included therein, so that the above-mentioned tasks of the multi-function radar that is referenced 12 on FIG. 1 are optimally fulfilled.

Up to now, radar management problems in multifunction radars having phase-controlled antennas were approached on the basis of heuristic methods that optimize no specifiable target functions, use operating modes pre-planned and off-line for resolving the search task and only allow a limited and slow adaptation to the variable surroundings.

The article by B. H. Scheff and D. G. Hammel entitled "Real-Time Computer Control of Phased Array Radars" in the publication "Supplemental to IEEE Transactions of Aerospace and Electronic Systems", published in Vol. AES-3, No. 6, November 1967, pp. 198–206, discloses a multi-function radar equipped with an electronically phase-controlled antenna that is computer controlled in real time and whose operations execution sequences are executed by a management program.

SUMMARY OF THE INVENTION

It is an object of the present invention to handle the generation of the most frequently-occurring, elementary radar requests as accurately as possible so that a basic framework for the radar management is present. Since operation under electronic countermeasures (ECM) conditions is typical for the utilization of a multi-function radar, this leads to the special task of the best distribution of transmission power in space as a function of the noise-power distribution in the search. The search makes the most requirements of the radar management because the most degrees of freedom are present here.

The above object is achieved, according to the present invention, in a multi-function radar having an electronically phase-controlled antenna, having a signal generator, having a transmitter, having a receiver, having a received signal processing device and having a radar measuring equipment that comprises a radar control device, a target tracking device and a radar management assembly that, among other things, continues to define the antenna lobe position, the sampling period, the signal shape and the form of the signal processing and supplies instructions in this regard to the radar measuring equipment as elementary radar requests, as a result of which the radar power available in the radar measuring equipment is optimally utilized in the search at each instant of time, and is particularly characterized in that, in the basic case, i.e. given the presence of neither clutter nor shadowings, and optimum sampling period $T_{opt} = [c'/(4v_R)]^4 (P/N)]^{\frac{1}{3}}$ and an optimum monitoring range $R_u = (\frac{3}{4})[(c'^4/(4v_R)).(P/N)]^{\frac{1}{3}} = R_D - v_R \cdot T_{opt}$ are provided for the optimization of the power utilization of the power part P in an antenna lobe provided for the search, whereby $v_R$ is the radial velocity of an object to be detected that is flying toward the radar, c′ is a constant dependent on the object to be detected and on fixed radar parameters, N is the noise power density, $R_D = c'(T_b/N)^{\frac{1}{4}}$ is the individual detection range and $T_B$ is the overall duration of the signal shape.

According to a particular feature of the invention, a multi-function radar as set forth above is further particularly characterized in that, given the presence of a shadowing occurring due to an obstacle located at the range $R_o$, the following relationships for the optimum sampling period $T_{opt}$ and for the optimum monitoring range $R_u$ are present such that:

$$T_{opt} = \begin{cases} [(c'/(4v_R))^4 \cdot (P/N)]^{\frac{1}{3}} & \text{for } P \leq P_o, \text{ or} \\ T_o \cdot (P_o/P) & \text{for } P > P_o, \text{ and} \end{cases}$$

$$R_u = \begin{cases} (3/4) \, [(c'^4/(4v_R)) \cdot (P/N)]^{\frac{1}{3}} & \text{for } P \leq P_o, \text{ or} \\ R_o - v_R \cdot T_o \cdot (P_o/P) & \text{for } P > P_o, \end{cases}$$

where the power value $P_o$ is defined by the relationship:

$$P_o = 4 v_R \cdot N \cdot R_o^3 \cdot c'^{-4}$$

According to another feature of the invention, the multi-function radar, as set forth above, is particularly characterized in that, given the presence of clutter and given at least approximate prescription of the function $R_d^{opt}$ ($T_b$) for the optimum detection range given clutter, the numerical optimization of the monitoring range results on the basis of the relationship:

$$R_u = R_d^{opt} (T.P) - v_R \cdot T.$$

According to another feature of the invention, the multi-function radar as justifying is further particularly characterized in that the optimization of the monitoring range is undertaken in an off-line manner.

According to another feature of the invention, the basic multi-function radar, as set forth above, is particularly characterized in that the distribution of the power part available overall for the search onto a plurality of antenna lobes occurs according to the relationship:

$$p_i = \left( A_i N_i^\alpha / \sum_{j=1}^{n} A_j N_j \right) \cdot (1 - v),$$

where $p_i$ is the power part to be allocated to the $i^{th}$ ($i = 1 \ldots n$) antenna lobe, $\alpha$ is a constant line between 0 and 1 that describes the stiffness of the overall diagram, $N_i$ and $N_j$ are the noise power density of the $i^{th}$ or, respectively, $j^{th}$ antenna lobe, v is the power part required for the target tracking and $A_i$ or, respectively, $A_j$ is a constant that is described in the following manner for the case $A_i$ $$A_i = [(\beta c_i/4)(c'^4_i/(4v_{Ri}))^{-\beta/3}]^{1/((\beta/3)+1)}.$$

where $\beta$ is a positive constant that is independent of i and is connected to $\alpha$ of the basis of the relationship $\alpha = (\beta/3)/[(\beta/3)+1]$: where $0 < \alpha < 1$, $v_{Ri}$ is the radial velocity of an object to be detected that is flying toward the radar and that is typical for a threat situation and $c'_i$ is the value that is uniform in solid angle regions having uniform threat situations.

According to another feature of the invention, the multi-function radar defined above is particularly characterized in that the distribution of the power part available overall for the search onto a plurality of antenna lobes occurs on the basis of an iteration method proceeding in the clock of the generation of the elementary radar request by optimization of a given costbenefit function $$u(R_1, \ldots, R_n) = \sum_{i=1}^{n} c_i R_i^{-\beta},$$

where $R_i$ is the monitoring range in the $i^{th}$ antenna lobe ($i = 1 \ldots n$), $c_i$ is a uniform value in the solid range regions having uniform threat situations and $\beta$ is a positive constant independent on i, the iteration method being based on the function $$(\partial u/\partial p_i) = c_i \beta [R_i(p_i)]^{-\beta-1} \cdot (DR_i/dp_i) = \lambda$$

as an identification equation for the power part $p_i$ of the $i^{th}$ antenna lobe, wherein $\lambda$ is to be selected such that $$\sum_{i=1}^{n} P_i = 1 - v,$$

where v is the power part needed for the target tracking, and such that the follow (d) sequence in each generation of an elementary radar request, wherein both $\lambda$ and the sum P of the actual transmission power parts $p_i$ are respectively updated:

(a) calculation of a solution $p_i'$ of the identification equation with the earlier $\lambda$ and simultaneous identification of f′ ($p_i'$) of the derivation of the right-hand side of the identification equation and the locations $p_i'$;

(b) adaptation of the power part according to $$p_{i,new} = p'_i [(1-v)/[P_{old} - P_{i,old} + p'_i]]$$

and generating the corresponding elementary radar request;

(c) updating the sum power P according to the relationship $$P_{new} = P_{old} - p_{i,old} + p_{i,new};$$

and (d) updating the parameter λ according to the expression $$\lambda_{new} = \lambda_{old} - f'(p_i').(p_{i,new} - p_i'),$$

or according to a similar iteration equation.

According to another feature of the multifunction radar as just-described is particularly characterized in that, after initialization, an elementary research request is generated in the following steps and the planning of the respective following search request is updated, including:

(a) selection of the next lobe position to be illuminated dependent on the optimum sampling period $T_{opt}$ of each lobe occurring in the optimization of the monitoring range that determine the next sampling time $$T_{ref,j+1} = T_{actual,j} + T_{opt}$$

of each lobe, so that it is respectively that lobe position for which the value $T_{ref,j+1}$ is lowest most is usually illuminated next;

(b) identification of the noise power in this lobe position;

(c) distribution of the power part available overall for the search onto a plurality of antenna lobes, but approximation of a given cost-benefit function $$U(R_1, \ldots, R_n) = \sum_{i=1}^{n} c_i R_i^{-\beta},$$

where $R_i$ is the monitoring range in the $i^{th}$ antenna lobe ($i = 1 \ldots n$), $c_i$ is a value uniform in solid angle regions having -, uniform threat situations, and! $\beta$ is a positive constant independent of i, on the basis of an iteration method sequencing in the clock of the generation of the elementary radar requests, the iteration method being based on the function $$(\partial u / \partial p_i) = c_i \beta [R_i(p_i)]^{-\beta-1}.(dR_i/dp_i) = \lambda$$

as an identification equation that is solved using the function $R_i(p_i)$ deriving from the noise power and other knowledge about the lobe position and wherein the parameter λ is to be selected such that the expression $$\sum_{i=1}^{n} p_i = 1 - v,$$

holds true, where v is the power part needed for the target tracking and the calculation of a solution $p_i'$ of the identification equation with the earlier λ and, simultaneously, the identification of the value f' ($p_i'$) of the derivation of the write-hand side of the identification equation at the location $p_i'$ occur;

(d) adaptation of the power part according to the expression $$p_{i, new} = p_i'(1-v)/(P_{old} - P_{i,old} + P_i');$$

(e) derivation of an optimum sampling period $T_{opt}$ for the optimization of the power utilization of the power part P provided for the search in a single antenna lobe and generation of an elementary radar request;

(f) updating of the sum P according to $$P_{new} = P_{old} - p_{i,old} + p_{i,new}.$$

and updating the parameter λ according to $$\lambda_{new} = \lambda_{old} - f'(p_i').(p_{i,new} - p_i')$$

or to a similar iteration equation; and (g) noting the planned time for the next illumination of this lobe position on the basis of the calculated, optimum sampling period $T_{opt}$.

According to another feature of the invention, a multifunction radar, as just described, is particularly characterized in that, in the basis case, i.e. given the absence of clutter and/or shadowings, the optimum sampling period is defined by the relationship $$T_{opt} = [(c'/(4v_R)^{4/3}(P/N)]^{\frac{1}{2}},$$

where $v_R$ is the radial velocity of an object flying toward the radar which is to be detected, c' is a constant that is dependent on the object to be detected and on the fixed radar parameters and N is the noise power density.

According to another feature of the invention, a multifunction radar, as described according to the second previous feature, is particularly characterized in that the optimum sampling time, given the presence of shadowing resulting on the basis of an obstacle located at the range $R_o$, results from the relationship $$T_{opt} = \begin{cases} [(c'/(4v_R))^4 \cdot (P/N)]^{\frac{1}{2}} & \text{for } P \leq P_o, \text{ or} \\ T_o \cdot (P_o/P) & \text{for } P > P_o, \end{cases}$$

where the power part $P_o$ is established by the expression $$P_o = 4v_R . N . R_o^3 . c'^{-4}.$$

According to another feature of the invention, the multifunction radar, as described above, is particularly characterized in that an optimum pre-occupation for the initialization of the next reactivation is derived from the condition of the referenced illumination times in the preceding turn-off of the radar.

The quality of the transmission power distributions, dependent on surroundings and situations, can be described with a cost-effective function. According to the present invention, the dynamic optimization thereof then leads to the best search power distribution and also leads to the generation of the best elementary radar requests in the search.

In addition to the search, that would probably make use of far more than half of the elementary radar requests during typical operation, the radar manager must take all previouslymentioned jobs of the multi-function radar into consideration and must generate and plan corresponding elementary radar requests. The planning of the non-search requests shall not be treated here.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
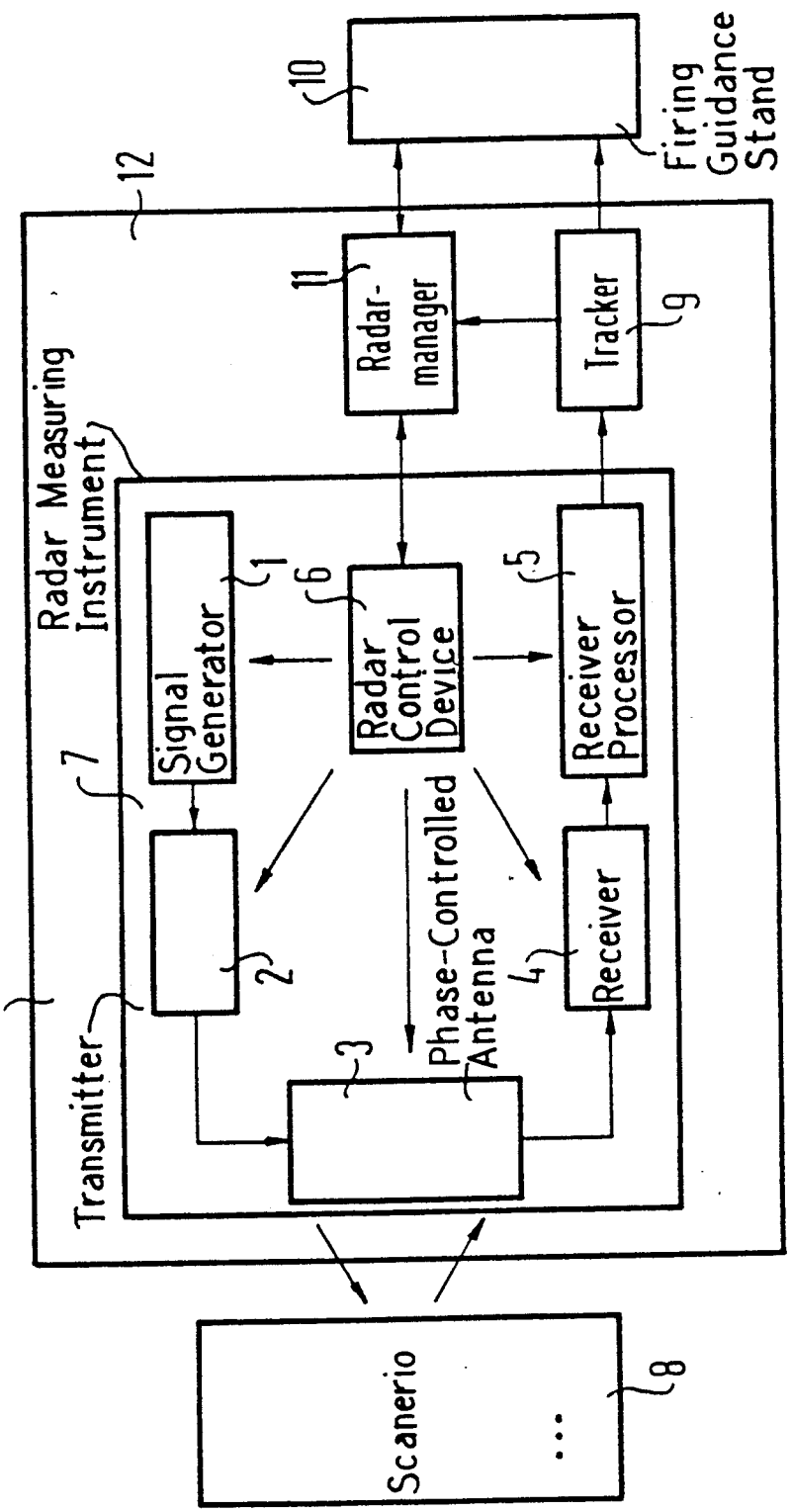
FIG. 1 is a block circuit diagram of the above-described multi-function radar.

The object of the search activities of a radar is to discover objects that fly into the space to be monitored as early as possible. This is usually formulated in the following manner. The range should be as great as possible; however, there are different range concepts that must be clearly discriminated, particularly when the sampling period is freely selectable. Their dependency from the generally-unknown and high-scattered properties of the objects to be detected is thereby pointed out. Further, with the range concept, the monitoring range is selected for the optimization of the radar management.

How the monitoring range can be optimized in the basic case, i.e. no clutter, no scatterings, but noise disturbances allowed, according to the present invention, shall be discussed. This is analytically possible with justifiable, simplifying exceptions. Three different results are obtained from this optimization, namely, the monitoring range as a function of the power part, the signal shape and the form of a signal processing as a function of the power part and the sampling period as a function of the power part.

The present invention also incorporates optimization rules in the case of shadowings or, respectively, clutter. Since the exact solution of this optimization task contains the optimum selection of signal shape in detail, no general solution can be set forth.

Different range concepts play a part in radar technology. Of these, however, the most wide-spread concept is not particularly suited for resolving the problem. The "unambiguous range" says nothing about the detection probability of concrete objects. The "individual detection range" is only suitable as an optimality criterion when the sampling period (time between two successive illuminations of the same lobe position) is established a priori. Without this prescription, the optimization would lead to infinitely-long sampling periods.

The "cumulative detection range" is also not particularly suited since, first of all, it is difficult to analytically manipulate, but also assumes that the sampling period is replanned over a plurality of samplings. This prerequisite, however, cannot be met in highly-dynamic scenarios (among other things, with cut-in/cut-off of jammers) when the radar is to adapt as quickly as possible to the situation and, consequently, should adapt its sampling period over and over.

The monitoring range $$R_u = R_d - v_R \cdot T \quad (1)$$

is proposed as an optimality criterion in practicing the present invention, where $R_d$ is the individual detection range, $v_R$ is the radial speed of the "object to be detected" (toward the radar) and T is the sampling period. The fact that $v_R$ and $R_d$ depend on the behavior and on the properties of the "object to be detected", already shows that the procedure is a "Bayes" procedure, i.e. the optimization based on an a priori assumption about the surrounding that the radar will presumably encounter. In addition to being dependent on the properties of the "object to be detected", $R_d$ is dependent on the environmental influences (ECM, clutter), on the fixed radar parameters, on the variable radar parameters (signal shape) and on the desired detection probability $p_D$ (for example 95%). The monitoring range can be verbally interpreted in the following manner.

The monitoring range is that range $R_U$ for which it can be guaranteed that an object flying radially in with the velocity $v_R$ will be detected at a range $R \geq R_U$ with the probability $p_D$, given the assumed "objects to be detected" in the assumed environmental conditions.

The interpretation of equation (7) provided in conjunction with the present invention strives for a high, reliable detection range ($p_D$ quantile). Given the same object velocity, the latter leads to significantly-shorter sampling periods than the optimization of a mean detection range.

The principle of greatest possible simplicity particularly testifies in favor of the monitoring range as optimality criterion. It is the most simple range definition that enables a meaningful optimization of the sampling periods. It even enables an analytical optimization in the "basic case" of the dependency $R_d(T)$ to be treated in the same manner.

The present invention illustrates how the optimization of the monitoring range in one lobe position supplies the optimum values for the monitoring range, signal shape and sampling periods for this lobe position as a function of the power part available.

The optimization of the monitoring range in the basic case shall be set forth below.

In an air-defense radar, the ECM case must be viewed as that case that should determine the design. When conditions that are otherwise beneficial (no clutter, no shadowings) are present, then the (individual) detection range can be expressed in a first approximation by the expression $$R_D = c'(T_B/N)^{\frac{1}{4}} \quad (2)$$

where $c'$ is the constant that is dependent on the "object to be detected" and on the fixed radar parameter, while N is the noise power density, $T_B$ is the overall duration of the signal shape, whereby the same is based on the assumption that the energy of the signal shape is proportional to the duration $T_B$.

The power part that is available for a lobe position is then established by the expression $$P = T_B T \quad (3)$$

since the mean power remains constant. When P is then viewed as being given, then the following expression is obtained by inserting the expression (3) into the expression (2) and the expression (2) into the expression (1), so that:

$$R_U = c'(T \cdot P/N)^{\frac{1}{4}} - v_R \cdot T \quad (4)$$

When $R_U$ is optimized in the standard manner by derivation according to T and zeroing the derivation, then the expression $$T_{opt} = [(c'/(4v_R))^4 (P/N)]^{\frac{1}{3}} \quad (5)$$

is obtained.

After some transformations, insertion thereof into the expression (4) supplies the expression $$R_U = (\tfrac{3}{4})[(c'^4/(4\nu_R))\cdot(P/N)]^{\frac{1}{4}} = R_d - \nu_R \cdot T_{opt} \tag{6}$$

With simple transformations, a compartison of expression (5) and expression (6) yields the expressions $$R_U = 3 \cdot \nu_R \cdot T_{opt}, \text{ and} \tag{7}$$

$$R_d = 4\nu_R \cdot T_{opt} \tag{8}$$

Equation (6) supplies the optimized monitoring range as a function of the power part. The equation (5) indicates the appertaining, optimum sampling period. In the approximation that has been used, the specification of an optimum signal shape is trival since $T_b$ appears as the sole characterizing quantity in the expression (2). For example, one pulse would be optimum when the unambiguous range is optimized as a secondary criterion.

In practice, the unambiguous range $R_e$ which will be desired in fact lies quickly above the range $R_d$ but does not amount to a multiple of $R_d$. With the value c equal to the speed of light, for example, the expression $$c \cdot T_B > 6R\eta \tag{9}$$

holds true, i.e. if $R_e$ were greater than, for example, three times the individual detection range, then the energy will be divided into a plurality of pulses in order to realize a possible decorrelation gain and to keep the range resolution in a beneficial region.

The optimization of the monitoring range, given shadowings, shall be set forth below.

Equation (2) for the individual detection range as a function of the signal shape is only approximately correct. When one wishes to take the shadowings and clutter into consideration, then this equation must be generalized.

Assume a solid obstacle, for example, a hill be situated at the range $R_o$ with a given lobe position. Shadowing is then referred to. The individual detectiol range is then upwardly limited by the range $R_o$ since an object of a greater range cannot be detected in any case. As long as the range $R_d$ established by equation (2) is less than or equal to the range $R_o$, the equation (2), however, holds true. Obtained overall is the expression $$R_d = \begin{cases} c'(T_B/N)^{\frac{1}{4}} & \text{when } T_B \leq (R_o/c')^4 \cdot N, \text{ and otherwise} \\ R_o. \end{cases} \tag{10}$$

$R_U$ can still be analytically optimized on the basis of this equation. It thereby follows that the equations (5) through (8) remain valid as long as the power part P is smaller than the value $P_o$ that results when $R_d = R_o$ is introduced into the equation (8), when the equation (5) is inserted and then resolution according to P is carried out. It therefore follows that $$P_o = 4\nu_R \cdot N \cdot R_o^3 \cdot c'^{-4} \text{ and} \tag{11}$$

$$T_o = R_o/(4\nu_R). \tag{12}$$

When a greater power part is available, then the additional power can no longer be employed for boosting the range $R_d$, but can only be employed for reducing the sampling period T. What is therefore obtained as a sampling period is expressed as $$T_{opt} = \begin{cases} [(c'/(4\nu_R))^4 \cdot (P/N)]^{\frac{1}{4}} & \text{for } P \leq P_o, \text{ and} \\ T_o \cdot (P_o/P) & \text{for } P > P_o. \end{cases} \tag{13}$$

Following as the equation for the monitoring range is the expression:

$$R_u = \begin{cases} (3/4)\,[(c'^4/(4\nu_R))\cdot(P/N)]^{\frac{1}{4}} & \text{for } P \leq P_o, \text{ and} \\ R_o - [\nu_R \cdot T_o \cdot (P_o/P)] & \text{for } P > P_o. \end{cases} \tag{14}$$

Given the approximation utilized, the signal shape enters in only via the illumination time $T_b$. In practice, signal shapes will be preferred for which the unambiguous range is greater than the range $R_o$ (but only slightly greater). This consideration is valid for the case $P \geq P_o$. Otherwise, the statements made concerning the selection of the signal shape in conjunction with the explanation of the basic case remain valid.

A situation shall be mentioned below that expressed by the equation (2) and the optimization of the monitoring range to be placed thereon which are not correct: for extremely short illumination times, in particular, the range is not defined by the expression (2) but by the expression $$R_d = \min\,[T_B \cdot c/2;\; c'(T_B/N)^{\frac{1}{4}}] \tag{15}$$

since only objects whose echoes return to the radar during a time interval $T_o'$ that is shorter than the time interval $T_B$ can be detected. In practice, this region in which the range $R_d$ comprises linearly with the time interval $T_B$ will seldom play a part. Nonetheless it is important to take this limitation into consideration, where extremely small intervals $T_B$ appear, i.e. intervals $T_b$ with the relationship $$T_B < T_o = [(2c'/c)^4 \cdot N^{-1}]^{\frac{1}{3}}. \tag{16}$$

The general equations for the optimum monitoring range, the optimum sampling period and the optimum signal shape given this latter generalization of the equation for the detection range $$R_d = \begin{cases} T_B \cdot c/2 & \text{for } T_B < T_o', \\ c'(T_B/N)^{\frac{1}{4}} & \text{for } T_o' \leq T_B \leq (R_o/c')^4 \cdot N, \text{ and} \\ R_o & \text{for } (R_o/c')^4 \cdot N < T_B \end{cases} \tag{17}$$

shall not be set forth here. However, a problem that can be completely analytically solved is involved.

The optimization of the monitoring range, given clutter, shall also be set forth below.

Fundamentally different problems are added, in particular, when clutter is present in the observed lobe. The detection range is then dependent on the signal shape and on the radial velocity (Doppler filter, blind speeds ...) in a relatively complicated manner.

Moreover, an optimization given the assumption of a defined radial velocity is not meaningful because the resultant signal shapes would fail entirely (blind speed problem) given different (similarly probable) radial velocities. If one wished to undertake a true optimization, then a formulation would have to be employed that leads to an extremely complicated optimization problem that cannot be analytically solved and that would probably not be accessible to faster numerical treatment (fast in the sense of being implementable on-line within the framework of the radar management). In this case, a long heuristic procedure is therefore proposed that supplies an approximate "optimum" detection range, as well as the appertaining signal shape for a given spectrum of objects to be detected, for a given illumination time, clutter shape and noise power.

The knowledge of this heuristic is not even necessary for the problem on which the present invention is based, specifying a frame structure for a radar management. The only time important is that it is possible, even with many simplifications, to specify an approximation for the course of the function $$R_d^{opt}(T_b) \tag{18}$$

even in clutter, just as equation (17) does without clutter. It is also possible to specify the appertaining signal shapes and forms of signal processing.

When the expression (18) is known, then the numerical optimization of the monitoring range that derives by the insertion of the expression (3) into the expression (18) and of the expression (18) into the expression (1), deriving as $$R_U = R_d^{opt}(T \cdot P) - v_R \cdot T \tag{19}$$

is easily possible. The monitoring range $R_U$, the signal shape and the form of the signal processing, as well as the sampling period, are obtained as a function of the power part P in this manner, just as in the treatment in the basic case and of the shadowing case.

These functions correspond to the equations (5) and (6) in the basic case. It is meaningful to provide an off-line optimization so that fast function procedures are available on an on-line basis.

It was shown in the preceding part how the optimization of the monitoring range in a lobe leads to the function $R_U(P)$ and how the signal shape and the sampling period are therefore defined by the power part P.

The concern in the following is therefore to optimally beneficially design the search performance of the multi-function radar by optimum distribution of the power part available overall for the search. To that end, the term "search performance" is first operationalized, namely on the basis of a cost-benefit function.

This cost-benefit function is then optimized under the secondary condition of a limited power part that is available. This optimization occurs, first of all, for the case wherein clutter and shadowings are not present in all of the participating lobes, and limit cases are also discussed that correspond to the demand for uniform monitoring range, on the one hand, and the demand of a permanently prescribed power distribution, on the other hand. Secondly, an optimization occurs for the general case, i.e. for cases as well having lobe positions in which clutter and shadowings are present. This leads to a method for the generation of search request. This method optimizes a cost-benefit function yet to be defined below, but also simultaneously realizes a dynamic matching to chronologically-variable prescriptions and environmental influences.

The search performance of a radar is described in a meaningful manner when a monitoring range is established for all solid angle elements (lobe positions). This defines a threedimensional space area (volume) that is reliably monitored in the manner already set forth in detail above. This space area is to be referred to as the momentary coverage area of the radar.

A phased-array radar opens up the possibility of designing the coverage area very flexibly, whereby the question is raised regarding which of the realizable coverage areas is optimum. One comes a step closer to answering this question when, given two respective coverage areas, a decision can be made as to whether they are "of the same quality" or, respectively, regarding which the two coverage areas is "better". In particular, a cost-benefit function can then be defined based on the number of coverage areas whose optimization then leads to the "optimum", realizable coverage area.

Figure 2:
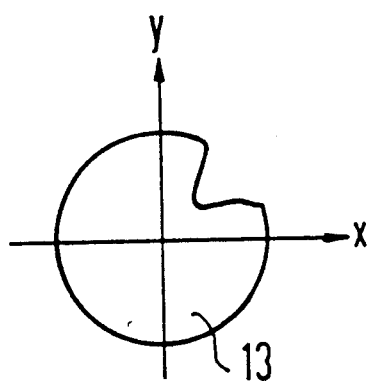
FIGS. 2 and 3 are two different coverage diagrams, as explained below.
Figure 3:
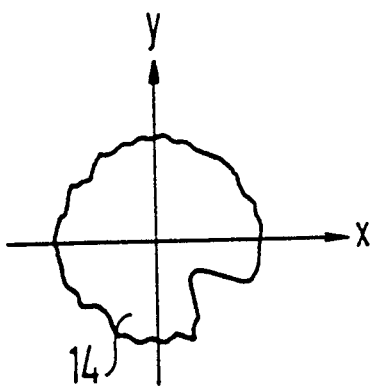

However, the comparison of the quality of two coverage areas is difficult, as can be seen with reference to the example of FIGS. 2 and 3 that show two different coverage areas 13 and 14, respectively, in the x-y plane. A meaningful cost-benefit function is therefore constructed in accordance with the invention in a directed manner.

First of all, a determination can be made that a coverage area A is "better" than a second coverage area B when the monitoring range in the area A is greater in every solid angle element than in the area B. This means that the costbenefit function must be a monotonously-rising function of the monitoring ranges in all lobe positions, to wit:

$$u(R_1, R_2, \ldots, R_n) \leq u(R'_1, R'_2, \ldots, R'_n) \tag{20}$$

when $R_1 \leq R'_1$, $R_2 \leq R'_2$, ..., $R_n \leq R'_n$, where n is the plurality of lobe positions and $R_i$ (or, respectively, $R'_i$) is the monitoring range in the $i^{th}$ lobe.

Now, however, a determination must also be made as to how the ranges in the different lobe positions are to be weighted relative to one another. Formulated differently, what range sacrifice in the lobe position i is one prepared to accept when a (monitoring) range gain $\Delta R$ can be obtained in the lobe position j as a tradeoff?

Answering this question becomes extremely difficult when the answer is allowed to be dependent on the ranges in all other lobe positions k (with $i \neq k \neq j$). When, by contrast, it is assumed, as is very frequently done when constructing costbenefit functions, that the answer to the above question is independent thereof, then the cost-benefit function can be written in the specific form $$u(R_1, \ldots, R_n) = \sum_{i=1}^{n} u(R_i) \tag{21}$$

i.e., the overall cost-benefit can be written as the sum of the individual cost benefits in the individual lobe positions. These remain to be defined.

The only thing up to now is that $u_i(R_i)$ is a monotonously-rising function. It will certainly not be possible to specify this function once and for all since the cost benefit that a certain range in a certain lobe position yields is drastically dependent on the threat situation. When, for example, it is known where hostile aircraft can enter into the air space, than a high monitoring range in the corresponding solid angle regions yields a higher benefit than in solid angle regions that are less jeopardized or that are even reliably covered by neighboring sensors. One can therefore anticipate that $u_i(R_i)$ can be recited up to one (or more) parameters. Some requirements are then made of the function $u_i(R_i)$ and, based on the principle of the greatest possible simplicity, a structure of this function is then set forth that is simple and that meets these demands. Meaningful demands are:

(a) $u_i(R_i)$ is monotonously rising;

(b) $u_i(R)_i$ obtains an asymptotic value (without limitation 0) for $R \rightarrow \infty$, and ranges beyond certain limits, in particular are advantageous neither for introducing defensive measures nor for positional portrayal;

(c) $u_i(R_i)$ rises steeply at short ranges; and (d) given extremely short ranges that no longer allow an initiation of defensive measures in time, the benefit is constant (at the lowest level); however, this property will not play a significant part in "typical operation", so that it can even be omitted in a first approach.

Figure 4:
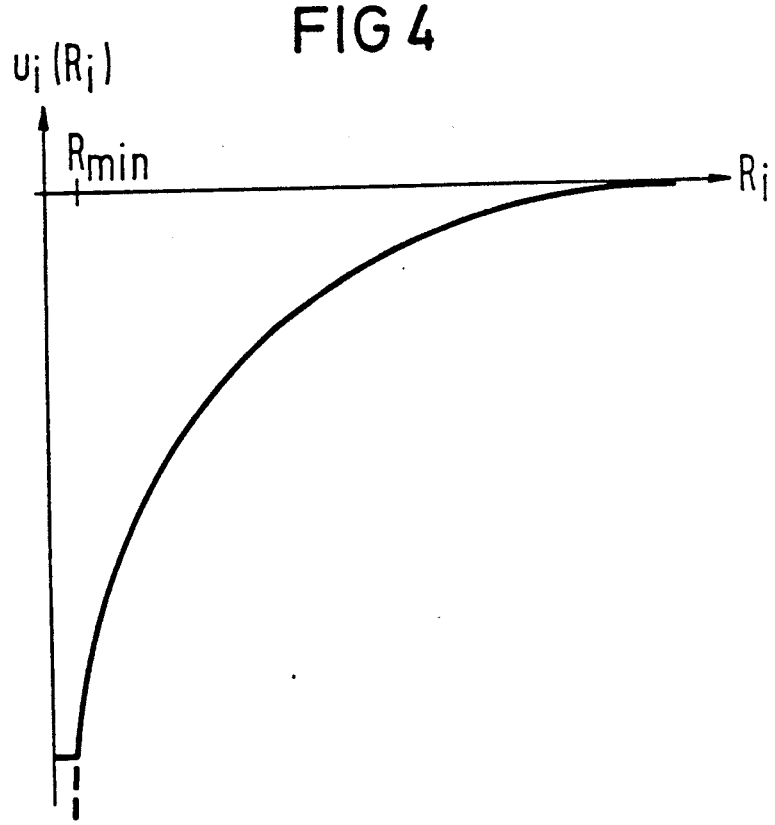
FIG. 4 is a graphic illustration showing the curve of a cost-benefit function corresponding to the requirements of the radar.

FIG. 4 illustrates the qualitative curve of a cost-benefit function $u_i(R_i)$ that meets these requirements. Available as a simple expression for such a cost-benefit function are the expressions $$u_i(R_i) = \begin{cases} -c_i R_i^{-\beta} & \text{for } R_i \geq R_{min}, \text{ and} \\ -c_i R_{min}^{-\beta} & \text{for } R_i < R_{min} \end{cases} \quad (22)$$

or, neglecting the last requirement (demand for constancy for extremely small $R_i$) may be potentially foregone so that the broken-line curve at the bottom left in FIG. 4 occurs, that is $$u(R_i) = <c_i R_i^{-\beta} \quad (23)$$

where $\beta$ is a positive constant independent of i. Due to the expression (21), the overall cost-benefit function in the case of the expression (23) is $$u(R_1, \ldots, R_n) = - \sum_{i=1}^{n} c_i R_i^{-\beta} \quad (24)$$

where $c_i$ will normally not differ from lobe position-to-lobe position, but will have a uniform value in the solid angle areas with a uniform threat situation.

In the specification of the invention, it was discussed at the outset of a monitoring range $R_i$ in an arbitrary lobe position can be determined as a function of the power part $p_i$ available for this lobe. A function of the monitoring range $R_i$ was introduced above that describes the "search performance" of the system dependent on the monitoring range $R_i$. Optimum "search performance" is obtained by maximizing the cost benefit function $$u(R_1(p_1), R_2(p_2), \ldots, R_n(p_n)) = max \quad (25)$$

given the secondary condition $$\sum_{i=1}^{n} p_i = 1 - \nu, \quad (26)$$

where $\nu$ is the power part necessary for the tracking. This secondary condition suffices for describing the situation when the overall power can be arbitrarily divided onto the existing lobe conditions, as is the case given an arrested antenna.

The power cannot be arbitrarily distributed onto the lobe positions given a rotating antenna since each lobe position cannot be illuminated at each time. In addition to the expression (26), this leads to further, complex secondary conditions whose treatment shall not be discussed here.

Optimization tasks having secondary conditions are solved with the method of Lagrange. In addition to the expression (26), the following n equations for the unknowns $p_1, p_2, \ldots p_n$, and $\lambda$:

$$\frac{\partial}{\partial p_i} u(R_1(p_1), R_2(p_2), \ldots, R_n(p_n)) = \lambda, \quad (27)$$

where $i = 1, \ldots, n$.

Such equation systems can be analytically solved in simple cases wherein, for example, clutter and shadowings are not present. When an analytical solution is not possible, then iteration methods can be employed, whereby a further, important aspect can also be taken into consideration at the same time.

How a "best" power distribution is obtained for permanently-prescribed parameters (such as noise power, tracking load . . . ) shall be discussed first. The time dependency of the parameters is left out of consideration. One speaks of a static optimization in such instances; this static optimization shall be set forth below and is therefore valid for what is referred to as the basic case.

The equation (6) set forth above was derived for the monitoring range for what is referred to as the basic case.

When the lobe index i is entered everywhere in the equation (6), then $$R_i = (\tfrac{3}{4})[(c_i'^4/(4\nu_{R_i}))\cdot(P_i/N_i)]^{\tfrac{1}{4}} \quad (28)$$

holds true for each lobe (1...n). The term $c'_i$ therein is a value that is uniform in solid angle regions having a uniform threat situation, $v_r$ the radial velocity of an object flying toward the radar that is to be detected and that is typical for this threat situation, $N_i$ is the noise power density of the $i^{th}$ antenna lobe and $p_i$ is the power part to be allocated for the $i^{th}$ (i=1 . . . n) lobe. Therefore $$u(R_1, \ldots, R_n) = - \sum_{i=1}^{n} (\tfrac{3}{4})^{-\beta/3} c_i[(c_i'^4/4\nu_R)\cdot(P_i/N_i)]^{-\beta/3} \quad (29)$$

equation (27) therefore reads $$(\tfrac{3}{4})^{-\beta/3}(\beta/3)\cdot c_i[(c'^4_i/(4\nu_R)\cdot(1/N_i)]^{-\beta/3}\cdot P_i^{(-\beta/3)-1} = \lambda \quad (30)$$

Resolution with respect to the power part $p_i$ yields $$p_i = [(\beta c_i/(3))\cdot(c_i'^4/(4\nu_{R_i}N_i))^{-\beta/3}]^{1/((\beta/3)+1)}(\tfrac{3}{4})^{-\beta/3} \quad (31)$$

When the new constants $$\alpha = (\beta/3)/[(\beta/3)+1]; \quad 0 < \alpha < 1 \quad (32)$$

and $$A_i = [(\beta c_i 3)\cdot(c'^4_i/(4\nu_{R_i}))^{-\beta/3}]^{1/(\beta/3)+1}\cdot(\tfrac{3}{4})^{-\beta/3}. \quad (33)$$

are entered, then one obtains the expression $$p_i = \lambda^{-1/(\beta/3)+1} \cdot A_i N_i^\alpha. \tag{34}$$

The equation system (26) and (27) is thereby solved by the expression $$P_i = (A_i N_i^\alpha) / \sum_{j=1}^{n} (A_j N_j^\alpha)(1 - \nu). \tag{35}$$

The power distribution onto the lobes that is the best in the sense of the above-identified optimality criteria is therefore found.

The two extreme cases $\alpha = 0$ and $\alpha = 1$ are particularly instructive. They are to be considered for that case wherein all lobe positions "are of the same type", i.e., the same reflection or echo cross section and the same radial velocity are employed in the calculation of the monitoring range in each lobe and the parameters $c_i$ that describe the importance of the $i^{th}$ lobe in the cost-benefit function of the expression (23) should not be dependent on the lobe i. The constants $A_i$ are therefore also not dependent on the lobes i.

When, in the equation (35), the limit case $\alpha \to 0$ (or equivalent thereto, $\beta \to 0$) is then considered, then the power part $p_i$ is also independent of i. This means that the radar search power is uniformly distributed onto all lobes, regardless of how the noise powers $N_i$ are distributed. This limit case, expressed in rough terms, corresponds to a radar without radar management.

In the other limit case, $\alpha \to 1$ (or, equivalent thereto, $\beta \to \alpha$), the power part $p_i$ is proportional to the noise power $N_i$. Due to the equation (28), this means that the same monitoring range occurs in each lobe. It also follows that the sampling period is also uniform for all lobes.

The actual case of interest, $0 < \alpha < 1$, covers the compromises between a rigid power distribution ($\alpha = 0$) and rigid range relationships ($\alpha = 1$). An elastic reduction of the ranges in the disturbed regions is therefore possible; although the power is concentrated onto disturbed regions, the range in the undisturbed regions is only slightly reduced. Since $\alpha$ described the stiffness of the coverage diagram, such stiffness $\alpha$ could be called the stiffness parameter of the ECCM management. Useful values for $\alpha$ would have to be calculated by simulation.

Figure 5:
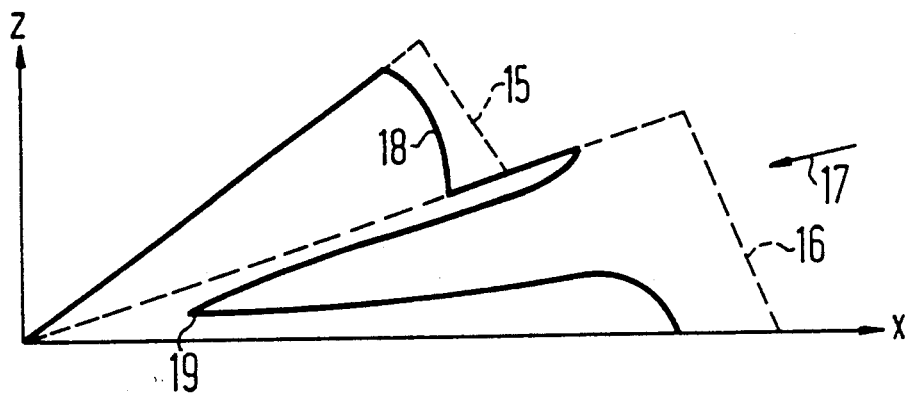
FIGS. 5, 6 and 7 are graphic illustrations of three instances for illustrating the range retraction given malfunction (e.g. massive electronic countermeasures).
Figure 6:
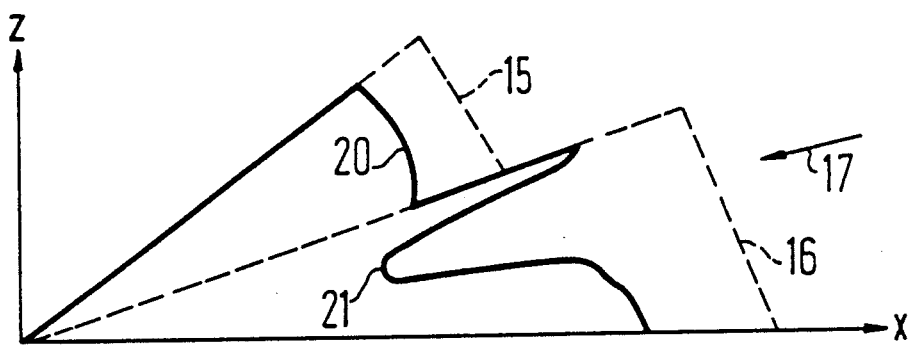
Figure 7:
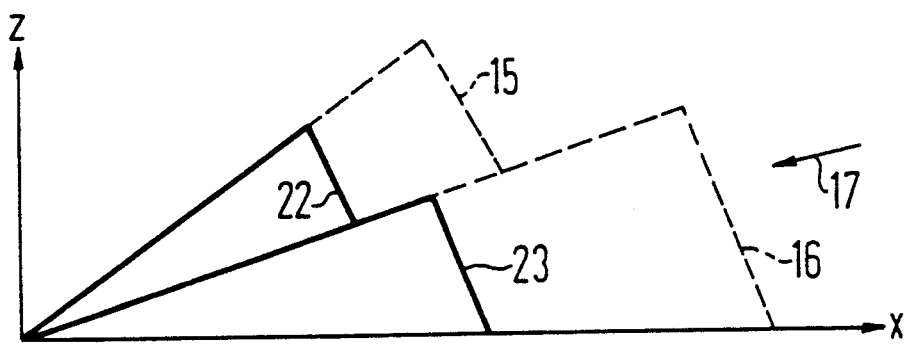

For illustration, FIGS. 5, 6 and 7 illustrate three instances of range reduction given disturbance, proceeding from an ideal coverage area 15, 16 (shown in broken lines), namely for the case wherein the stiffness parameter $\alpha$ is established by $\alpha = 0$ (FIG. 5), by $0 < \alpha < 1$ (FIG. 6) and $\alpha = 1$ (FIG. 7). The noise direction in the x-z coordinate system is shown with an arrow 17 in all three cases. It can be seen in the case $\alpha = 0$ (FIG. 5), how the rigid power distribution leads to deep range collapses in a highly-disturbed area 19. In the case where $\alpha = 1$ (FIG. 7), by contrast, the monitoring range is rigidly reduced in the areas 22 and 23 which are respectively fractional areas of the ranges delineated by the ranges 15 and 16. In the case where $0 < \alpha < 1$ (FIG. 6), it may be seen how the monitoring range is elastically reduced in the disturbed area 21 but, by contrast, it pulled only slightly back in the undisturbed areas, for example, in the area 20. In the optimization of the cost-benefit function indicated in equation (24) explicit use thereof is made above that the monitoring range as a function of the power part of the lobe position is established by the relatively simple function according to equation (28).

How a "best" power distribution is obtained for permanently-prescribed parameters (such as noise power, tracking lobe . . . ) was thus discussed. The time dependency of the parameters was omitted from consideration. One is speaking of static optimization in such cases.

However, environmental conditions and tracking load can change seriously within an average sampling period. A static observation is therefore not adequate. A time-dependent (dynamic) optimization problem is present that is likewise resolved by the present invention.

A general method with whose assistance the cost-benefit function (24) can be optimized is set forth below. Only a static optimization under the secondary condition of the equation (26) is mentioned first.

It can thereby be assumed that the optimum monitoring range has a function of the power part $R_i(p_i)$ and is a convex, strictly monotonous rising function:

$$d^2 R_i / dp_i^2 \leq 0 \tag{36}$$

when the function (24) is then inserted into the equation (27), then $$(\partial u / \partial p_i) = c_i \beta [R_i(p_i)]^{-\beta - 1} \cdot (dR_i / dp_i) = \lambda \tag{37}$$

is thereby obtained as definitions for the lobe power part $p_i$, where $\lambda$ is to be selected such that $$\sum_{i=1}^{n} p_i = 1 - \nu, \tag{38}$$

holds true.

As a result of $$\lim_{p_i \to 0} R_i(p_i) = 0 \tag{39}$$

the left side of the equation (37) is a function of the low power part $p_i$ that strives toward $+\infty$ in case of $p_i \to 0$ and decreases strictly monotonously for $0 < p_i < 1$. It follows from these properties that the equation (37) has exactly one solution for each $\lambda > \lambda_{min}$.

This means that the power distribution for a lobe derives from the solution of a single equation. The power parts of the other lobes enter in only via the parameter $\lambda$. It is consequently not necessary to preplan the power parts for all lobes at greater time intervals; rather, one can restrict oneself to calculating the power part at each lobe position only when this lobe position is to be, in fact, illuminated.

On the one hand, this drastically reduces the calculating expense. On the other hand, this procedure leads directly to a practical procedure given chronologically-changing parameters, i.e. it can be employed for a dynamic optimization.

The adaptation to the overall load occurs on the basis of an updating of the parameter $\lambda$. A method for this purpose requires the following steps (a) through (d) in each illumination, i.e. generation of an elementary radar request, in which the parameter $\lambda$ as well as the sum P of the actual search power parts $p_i$ are respectively updated:

(a) calculation of a solution for $p_i'$ of the equation (37) with the earlier value $\lambda$; simultaneous identification of f' $(p_i')$ of the derivation of the right-hand side of the equation (37) at the location $p_i'$;

(b) adaption of the power part according to $$p_{i,new} = p'_i \cdot (1-v)/(p_{old} - P_{i,old} + p'_i) \qquad (40)$$

and generating the corresponding elementary radar request;

(c) Updating of P according to the expression $$p_{new} = P_{old} - P_{i,old} + P_{i,new}; \text{ and} \qquad (41)$$

(d) Updating of λ according to the expression $$\lambda_{new} = \lambda_{old} + f'(p'_i) \cdot (p_{i,new} - p'_i) \qquad (42)$$

or a similar iteration equation.

In each illumination, therefore, this method corrects both the power part of the affected lobe position as well as the parameter λ such that both of the equations (37) and (38) are "approximately" satisfied "longer-lasting"..

If the environmental conditions and the tracking load were constant, then the solution of the equation system (26), (27) and, therefore, the optimum power distribution would be established with this iteration method; proceeding on the basis of an arbitrary search performance, a search performance would converge with the optimum with one iteration step per elementary radar request. Nothing about the speed of the convergency, however, has yet thereby been stated.

The advantage of the illustrated, iterative procedure compared to the attempt to exactly plan the low power $p_i$ for a longer time is comprised and the better capability to react to a changing environment. Moreover, the search task can be achieved by on-line planning.

The advantage of this "proximitive solution" of the equation system (26), (27) "adapted to practice" compared to the attempt to solve the complete equation system in every illumination is a two-fold advantage. First of all, in particular, the calculating expense would be enormous, and, then, secondly, the elementary radar request from the past cannot be cancelled; the overall power distribution is therefore not newly at one's disposition at each instant of time, but the only concern is to optimize with respect to the low position i just being treated.

In summary, the following advantages can be identified by employing the described iteration method in a multi-function radar.

It offers an immediate adaptation to changes in the environment (for example, tracking load v and to noise powers $N_i$). In the static case, it converges toward the exact solution. It does not require any exaggerated calculating expense. It leads to surveyable calculating sequence that is open to subsequent, heuristic modifications. The most simple form was initially selected in view of such modifications that are possible given the presence of simulation experiences.

According to an advantageous embodiment of the invention, this iteration occurs in step with the generation of the elementary radar requests, i.e. an iteration step is carried out for that lobe position that is to be illuminated in the next moment. The appertaining calculating execution for a dynamic optimization shall be set forth in outline below.

1. Selection of the next lobe position (shall be treated below).
(2) Identification of the noise power in this lobe position.
(3) Solution of the equation (37) upon employment of the function $R_i(p_i)$ that results from the noise power and from other knowledge about the lobe position.
4. Adaptation of the power part according to the equation (40).
5. Derivation of an optimum sampling period and generating the optimum elementary radar requests.
6. Updating of P and λ in accordance with the equations (41) and (42).
7. Noting the planned time for the next illumination of this lobe position (also discussed below).

An even greater aspect, however, is thereby still lacking, in particular the chronological sequence in which the individual lobe positions are treated. This is relatively simple when all the lobe positions that can be illuminated at all can be reached at each time (arrested antenna). This case shall be discussed below. The significantly more complicated case of a rotating antenna is not discussed in this context. In conclusion, the initialization of the radar management shall than also be discussed.

Given an arrested antenna, each lobe position can either not be illuminated at all or can be illuminated at an arbitrary time. Leaving initialization problems that shall be discussed later out of consideration, the chronological organization for this case is extremely simple.

As was already shown above, an optimum sampling period $T_{opt}$ results in the optimization of the monitoring range. It is therefore defined, however, at what time a given lobe position should be scanned the next time:

$$T_{ref,j+1} = T_{actual,j} + T_{opt}, \qquad (43)$$

where $T_{opt}$ is the optimum sampling period for this lobe position as derives in the $j^{th}$ illumination from the optimization of the monitoring range.

This plan can certainly not always be exactly observed, although it already takes the boundary conditions valid at the time of its construction into consideration. However, it is a meaningful procedure to respectively illuminate the lobe position for which $T_{ref,j+1}$ is the lowest as the next lobe position. A fine tuning in the radar planning can therefore be achieved in the most simple manner.

In practice, one does not always gladly classify new elements into a list of a few thousand elements for reasons of circulating time. However, it is also definitely adequate when sorting is undertaken according to a grid (for example 1/10 second) and when the differences between the sampling times that are smaller than the grid are left out of consideration.

It has heretofore been assumed that all lobe positions have already been illuminated once and reference illumination times have therefore been calculated. This, however, is not the case when turning the radar on. It is therefore not necessary to prescribe a set of reference illumination times for all lobe positions at the start.

The most simple possibility for this is to offer an initialization set that, for example, sees to it that the lower elevations are scanned first, whereby all azimuth values have the same priority.

A plurality of initialization sets could also be offered that prescribe different sequences of the scanning for the beginning of the search, for example while emphasizing various azimuth regions or with prioritization of higher elevations.

The most ambitious, but relatively involved, way of initialization would be comprised in deriving an optimum preoccupation for the next reactivation from the condition of the reference illumination times at the preceding turn off of the radar.

Initialization problems are present not only at the rigid illumination times, but at practically all occurring values.

The "knowledge of the radar manager about the individual lobe positions" is particularly important proceeding from the data set. In particular, this knowledge comprises all parameters that are necessary in order to implement the prescribed optimization of the monitoring range. In the basic case and in the shadowing case, the radial velocity $v_R$ and the radar reflection cross section (that defines $c'$) of the "normal threat" in the appertaining lobe position, the sighting distance $R_o$ maximally possible because of shadowings in the appertaining lobe position and the noise power density N of the lobe position are needed for this purpose.

The optimization of the selection of the original shape given clutter requires at least the additional information as to whether or not clutter is situated in the appertaining lobe position. Further parameters such as, for example, a suspicion concerning the type of clutter (volume or ground clutter), an estimation of the clutter density (as a function of the range in the extreme case), an estimate of the range area in which the clutter occurs, and an estimate of the (radial) velocity of the clutter and of the scatter of this velocity are additionally required for a better optimization.

Since these information are not directly present in a real radar, but must be acquired from the signal processing, the requirements made of the quality of these information cannot be over emphasized.

In the initialization of this "knowledge about the individual lobe positions", it will proceed on the basis of the clear condition (no clutter, no noise, no shadowing) in the most simple case and will correspondingly preoccupy the parameters. Upon reactivation, one will want to tie into the state of knowledge about conditions at the turn-off time.

In the initialization of the power distribution, i.e. of $p_{i,old}$, one can proceed on the basis of an equal distribution of the overall power 1 in the most simple case, to wit:

$$P_{old}=1; \ P_{i,old}=1/n. \quad (44)$$

A pre-setup to the power distribution before the most recent turn-off event should also be possible as should be the selection of an a priori power distribution that deviates from the equation (44).

The initialization of the parameter λ must be adapted to the procedure in the power distribution and to the "knowledge about the individual lobe positions". When this is present, then the parameter λ derives from the equation (38). In practice, different values of λ will derive for each i since one is only at the beginning of the iteration. The parameter λ will therefore be calculated for a plurality of values of i and the average will be formed.

An appendix for the derivation of the equations (5) and (6) follows:

Derivation of the equation (4) is derived from $$dR_u/dT = c'(P/N)^{\frac{1}{4}}.(\tfrac{1}{4}) .T^{-\frac{3}{4}} - v_R. \quad (45)$$

Zeroizing the derivation supplies the expression $$v_R = (c'/4)(P/N)^{\frac{1}{4}}.T_{opt}^{-\frac{3}{4}} \quad (46)$$

from which the expression $$T_{opt}^{\frac{3}{4}} = (c'/(4v_R))(P/N)^{\frac{1}{4}} \quad (47)$$

the next line follows, as does the expression $$T_{opt} = (c'/(4v_R))^{4/3}(P/N)^{\frac{1}{3}} \quad (48)$$

A slight transformation thereof supplies the expression $$T_{opt} = [(c'/(4v_R))^4 (P/N)]^{\frac{1}{3}}. \quad (49)$$

When the period $T_{opt}$ is inserted into the equation (4), then the following expression is obtained.

$$\begin{aligned} R_U &= c' \ [(c'/(4v_R))^4(P/N)]^{1/12} \cdot (P/N)^{\frac{1}{4}} - \\ & \quad v_R \cdot [(c'/(4v_R))^4(P/N)]^{\frac{1}{3}} \\ &= c' \ (c'/(4v_R))^{\frac{1}{3}}(P/N)^{\frac{1}{3}} - (c'/4) \ (c'/(4v_R))^{\frac{1}{3}}(P/N)^{\frac{1}{3}} \\ &= (\tfrac{3}{4})c' \ (c'/(4v_R))^{\frac{1}{3}}(P/N)^{\frac{1}{3}} = (\tfrac{3}{4}) \ [(c'^4/(4v_R)) \cdot (P/N)]^{\frac{1}{3}} \end{aligned} \quad (50)$$

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a method of radar searching for an object flying in an area of radar coverage in which radar signals are transmitted via lobes from an electronically phase-controlled antenna, radar signals are received, the received radar signals are processed all under the control of a radar control device of a radar measuring equipment, and in which available radar power is controlled by continuously defining the antenna lobe position, while defining a sampling period, the signal shape and the form of signal processing, and forming instructions representing such definitions as clocked elementary radar requests to the radar measuring equipment to optimally utilize the available radar power at all times during searching, the improvement therein, in the basic case including the absence of clutter and shadowing, the steps of:

selecting an optimum sampling period $T_{opt}$ in accordance with the expression $$T_{opt} = [(c'/4v_R)^4.(P/N)]^{\frac{1}{3}}; \text{ and}$$

selecting an optimum monitoring range $R_U$ in accordance with the expression $$R_U = \tfrac{3}{4}[(c'^4/4v_R).(P/N)]^{\frac{1}{3}} = R_d - v_R.T_{opt}$$

for the optimization of power utilization of the power P in an antenna lobe provided for the search, where $v_R$ is the radial velocity of an object to be detected that is flying toward the antenna, $c'$ is a constant depending on the object to be detected and on fixed parameters, N is the noise power density, $R_d = c'(T_B/N)^{\frac{1}{4}}$ is the individual detection range and $T_B$ is the overall duration of the signal shape.

2. The improved method of claim 1, wherein, in the presence of shadowing occurring due to an obstacle in the range $R_o$, the improvement is further defined as:

selecting an optimum sampling period $T_{opt}$, in accordance with the expression $$T_{opt} = [(c'/(4v_R))^4 \cdot (P/N)]^{\frac{1}{3}}$$

where $P \leq P_o$, and $$T_{opt} = T_o \cdot (P/P_o)$$

where $P > P_o$; and
selecting the optimum monitoring range $R_U$ in accordance with the expression $$R_U = \frac{3}{4}[(c'^4/(4v_R)) \cdot (P/N)]^{\frac{1}{3}}$$

where $P \leq P_o$, and $$R_U = R_o - v_R \cdot T_o \cdot (P_o/P)$$

where $P > P_o$,
where the power available $P_o$ is defined by the expression $$P_o = 4v_R \cdot N \cdot R_o^3 \cdot c'^{-4}.$$

3. The improved method of claim 1, wherein, in the presence of clutter and given at least an approximate prescription of the function $R_o(T_B)$, the improvement is further defined as:

optimizing the detection range $R_U$ in accordance with the expression $$R_U = R_d^{\rho pt}(T \cdot P) - v_R \cdot T.$$

4. The improved method of claim 1, the improvement being further defined as:

distributing the power part available overall for searching onto a plurality of antenna lobes in accordance with the expression $$p_i = \left( (A_i N_i^\alpha) / \sum_{j=1}^n (A_j N_j) \right) \cdot (1 - v),$$

where $p_i$ is the power part to be allocated to the $i^{th}$ antenna lobe ($i = 1 \ldots n$), $\alpha$ is a constant between 0 and 1 that describes the stiffness of the coverage diagram, $N_i$ and $N_j$ are the noise power density of the $i^{th}$ and $j^{th}$ antenna lobes, respectively, $v$ is the power part required for target tracking and $A_i$ and $A_j$ are constants as described in accordance with the expression $$A_i = [(\beta c_i/3) \cdot (c_i^4/(4v_{R_i}))^{-\beta/3}]^{1/(\beta/3)+1} \cdot (\tfrac{1}{3})^{-\beta/3}$$

where $\beta$ is the positive constant that is independent of $i$ and is connected to $\alpha$ on the basis of the expression $$\alpha = (\beta/3)/[(\beta/3) + 1]$$

where $0 < \alpha < 1$, $v_R$ is the radial velocity of an object to be detected that is flying toward the antenna and that is typical for a threat situation, and $c_i$ is a value that is uniform in solid angle regions having uniform threat situations.

5. The improved method of claim 3, wherein distributing the power part available overall for searching is further defined by iterating in accordance with the clocking of the elementary radar requests to optimize the distribution in accordance with the expression $$U(R_1, \ldots, R_n) = -\sum_{i=1}^n c_i R_i^{-\beta},$$

were $R_i$ is the monitoring range in the $i^{th}$ antenna lobe ($i = 1 \ldots n$), $C_i$ is a uniform value in solid angle regions having uniform threat situations, and $\beta$ is a positive constant independent on $i$, the iteration being based on the expression $$\partial u/\partial p_i = c_i \beta (R_i(p_i))^{-\beta - 1} (dR_i/dp_i) = \lambda$$

as identification for the power part $p_i$ of the $i^{th}$ antenna lobe, where $\lambda$ is selected such that $$\sum_{i=1}^n p_i = 1 - v$$

holds true, where $v$ is the power part needed for tracking, and wherein the following steps (a) through (d) are performed in sequence in each generation of an elementary radar request, whereby both $\lambda$ and the sum P of the actual transmission power parts $p_i$ are respectively updated (a) calculating the value $p'_i$ of the identification expression with the earlier value of $\lambda$ while simultaneously identifying the value $f'(p'_i)$ of the right-hand side of the identification equation at the location $p'_i$, (b) adapting the power part according to the expression $$p_{i,new} = p_i \cdot (1 - v)/(P_{old} - p_{i,old} + p'_i)$$

and generating a corresponding elementary radar request, (c) up-dating the sum power P in accordance with the expression $$P_{new} = P_{old} - p_{i,old} + p_{i,new},$$

and (d) up-dating the parameter $\lambda$ in accordance with the expression $$\lambda_{new} = \lambda_{old} + f'(p'_i) \cdot (p_{i,new} - p_i).$$

6. The improved method of claim 5, wherein after initialization, the improvement is further defined as:

generating an elementary search request by the following steps and the planning of the following search request is updated;

(a) selecting the next lobe position to be illuminated dependent on the optimum sampling period $T_{opt}$ of each lobe resulting in the optimization of the monitoring range that determines the next sampling time, in accordance with the expression $$T_{ref,j+1} = T_{actual,j} + T_{opt},$$

of each lobe so that the respective lobe positions for which the value $T_{ref,j+1}$ is lowest most is illuminated next;

(b) identifying the lobe power in this lobe;

(c) distributing the power part available overall for searching onto a plurality of antenna lobes while optimizing a cost-benefit function in accordance with the expression $$u(R_1, \ldots, R_n) = \sum_{i=1}^{n} c_i R_i^{-\beta},$$

where $R_i$ is the monitoring range of the $i^{th}$ antenna lobe ($i=1 \ldots n$), $c_i$ is a value uniform in solid angle regions having uniform threat situations, and $\beta$ is a constant independent of i, distributing occurring by iterating in the sequence of the clocked generation of the elementary radar requests in accordance with the expression $$\partial u/\partial p_i = c_i \beta (R_i(p_i))^{-\beta-1}(dR_i/dp_i) = \lambda$$

as an identification equation that is solved utilizing the function $R_i(p_i)$ deriving from the noise power and other knowledge about the lobe position; where $\lambda$ is selected such that $$\sum_{i=1}^{n} p_i = 1 - \nu,$$

holds true, where $\nu$ is the power part needed for tracking and the determination of the value $p'_i$ of the identification equation with the earlier value of $\lambda$ and, simultaneously, identifying the value of $f'(p'_i)$ of the derivation of the right-hand side of the identification equation at the location $p'_i$;

(d) adapting the power part in accordance with the expression $$p_{i,new} = p'_i \cdot (1-\nu)/(P_{old} - p_{i,old} + p'_i);$$

(e) determining the optimum sampling period $T_{opt}$ for the optimization for the power utilization of the power part P provided for the search in a single antenna lobe and generating an elementary radar request;

(f) updating the sum P according to the expression $$P_{new} = P_{old} - p_{i,old} + p_{i,new}$$

and of the parameter $\lambda$ according to the expression $$\lambda_{new} = \lambda_{old} + f'(p'_i) \cdot (p_{i,new} - p'_i); \text{ and}$$

(g) identifying the planned time for the next illumination of this lobe position on the basis of the calculated, optimum sampling period $T_{opt}$.

7. The method of claim 6, wherein, in the basic case in the absence of clutter and shadowing, the improvement is further defined as:

determining the optimum sampling period in accordance with the expression $$T_{opt} = [(c'/(4v_R))^{4/3}(P/N)]^{\frac{1}{2}},$$

where $v_R$ is the radial velocity of an object to be detected which is flying toward the antenna, $c'$ is a constant that is dependent on the object to be detected and on the fixed radar parameters and N is the noise power density.

8. The method of claim 6, wherein, in the presence of shadowing due to an obstacle located in the range $R_o$, the improvement is further defined as:

deriving the optimum sampling time $T_{opt}$ in accordance with the expressions $$T_{opt} = [(c'/(4v_R))^4 \cdot (P/N)]^{\frac{1}{2}}$$

where $P \leq P_o$, and $$T_{opt} = T_o \cdot (P_o/P)$$

where $P > P_o$, where the power part $P_o$ is established in accordance with the expression $$P_o = 4v_R \cdot N \cdot R_o^3 \cdot c'^{-4}.$$

9. The method of claim 8, wherein the improvement is further defined as:

deriving an optimum pre-occupation for the initialization in the next reactivation from the condition of the reference illumination times in the preceding turn-off of the radar.

* * * * *